United States Patent
Lee et al.

(10) Patent No.: US 9,900,863 B2
(45) Date of Patent: Feb. 20, 2018

(54) METHOD FOR RECEIVING OR TRANSMITTING BROADCAST SIGNAL IN WIRELESS COMMUNICATION SYSTEM AND APPARATUS THEREFOR

(71) Applicant: LG ELECTRONICS INC., Seoul (KR)

(72) Inventors: Jihyun Lee, Anyang-si (KR); Seungmin Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/421,118

(22) PCT Filed: Aug. 30, 2013

(86) PCT No.: PCT/KR2013/007829
§ 371 (c)(1),
(2) Date: Feb. 11, 2015

(87) PCT Pub. No.: WO2014/042373
PCT Pub. Date: Mar. 20, 2014

(65) Prior Publication Data
US 2015/0373668 A1    Dec. 24, 2015

Related U.S. Application Data

(60) Provisional application No. 61/701,720, filed on Sep. 16, 2012.

(51) Int. Cl.
*H04W 72/00*    (2009.01)
*H04W 72/04*    (2009.01)
(Continued)

(52) U.S. Cl.
CPC ......... *H04W 72/005* (2013.01); *H04L 5/0023* (2013.01); *H04L 5/0035* (2013.01);
(Continued)

(58) Field of Classification Search
CPC ... H04W 72/00; H04W 72/04; H04W 72/042; H04W 72/0453; H04W 72/005
See application file for complete search history.

(56) References Cited

U.S. PATENT DOCUMENTS 9,119,196 B2 *   8/2015   Nishio .................. H04L 5/0007
2011/0013730 A1   1/2011   Mansson et al.
(Continued)

FOREIGN PATENT DOCUMENTS

WO    WO 2012041467 A1 *    4/2012   ........... H04L 5/0037

OTHER PUBLICATIONS

Sharp, "Common Search Space in ePDCCH and fallback operation in Rel-11," 3GPP TSG RAN WG1 Meeting #69, R1-122390, May 2012, 7 pages.
(Continued)

*Primary Examiner* — Feben M Haile
(74) *Attorney, Agent, or Firm* — Lee Hong Degerman Kang & Waimey

(57) ABSTRACT

A method for receiving a broadcast signal through a new carrier type (NCT) in a wireless communication system according to one embodiment of the present invention is executed by a terminal and comprises the steps of: blind-decoding a physical broadcast channel (PBCH) received from a base station; and acquiring a number of antenna ports and system information of the base station from the PBCH, wherein the blind decoding is executed within a candidate range for the blind decoding of the PBCH corresponding to a partial area of a downlink subframe, and the candidate range is an area in which a symbol section is excluded in a
(Continued)

(a)

(b)

downlink subframe to which a physical downlink control channel (PDDCH) of a neighboring base station is mapped, and can be indicated by the base station in advance.

10 Claims, 12 Drawing Sheets

(51) Int. Cl.
*H04L 5/00* (2006.01)
*H04W 88/02* (2009.01)
*H04W 88/08* (2009.01)
*H04W 48/12* (2009.01)

(52) U.S. Cl.
CPC ......... *H04L 5/0092* (2013.01); *H04W 72/042* (2013.01); *H04L 5/005* (2013.01); *H04L 5/008* (2013.01); *H04W 48/12* (2013.01); *H04W 72/0453* (2013.01); *H04W 88/02* (2013.01); *H04W 88/08* (2013.01)

(56) References Cited

U.S. PATENT DOCUMENTS

| | | | |
|---|---|---|---|
| 2011/0026645 A1* | 2/2011 | Luo | H04L 1/0038 375/340 |
| 2012/0113846 A1 | 5/2012 | Narasimha et al. | |
| 2013/0114419 A1* | 5/2013 | Chen | H04W 72/044 370/248 |
| 2013/0194931 A1* | 8/2013 | Lee | H04L 5/0053 370/241 |
| 2013/0301549 A1* | 11/2013 | Chen | H04W 76/048 370/329 |
| 2013/0301565 A1* | 11/2013 | Xu | H04W 72/048 370/329 |
| 2015/0055485 A1* | 2/2015 | Kim | H04W 48/12 370/242 |
| 2015/0304995 A1* | 10/2015 | Yi | H04L 5/001 370/329 |

OTHER PUBLICATIONS

Itri, "Considerations on PBCH eICIC for CSG HeNB," 3GPP TSG-RAN WG1 #62, R1-104368, Aug. 2010, 6 pages.

Mediatek Inc., "ePDCCH transmission in PRBs where there are PBCH or PSS/SSS," 3GPP TSG-RAN WG1 #70, R1-123337, Aug. 2012, 5 pages.

PCT International Application No. PCT/KR2013/007829, Written Opinion of the International Searching Authority dated Jan. 28, 2014, 14 pages.

PCT International Application No. PCT/KR2013/007829, Written Opinion of the International Searching Authority dated Jan. 28, 2014, 21 pages.

* cited by examiner

METHOD FOR RECEIVING OR TRANSMITTING BROADCAST SIGNAL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2013/007829, filed on Aug. 30, 2013, which claims the benefit of U.S. Provisional Application Ser. No. 61/701,720, filed on Sep. 16, 2012, the contents of which are all hereby incorporated by reference herein in their entirety.

TECHNICAL FIELD

The present invention relates to a method for receiving or transmitting a broadcast signal in a wireless communication system and an apparatus therefor.

BACKGROUND ART

In a wireless communication system, a user equipment (UE) may receive data and/or various control information from a base station (BS) through a downlink (DL) and transmit data and/or various control information to the BS through an uplink (UL). In order to communicate with the BS, the UE needs to establish synchronization with the BS. To this end, a UE, which is turned on from a power-off state or newly enters a cell which is a geographic region served by a BS, performs initial cell search accompanying operation such as synchronization establishment with the BS. Upon completion of initial cell search, the UE may receive data and/or control information through a physical downlink channel and transmit data and/or control information through a physical uplink channel.

Due to various reasons including cell search, maintenance of time synchronization after synchronization between a UE and a BS, and correction of a frequency offset, a wireless communication system discussed up to now defines transmission/reception of various mandatory signals on designated radio resources.

The types and number of these mandatory signals have increased with the advance of the standard of the wireless communication system. Since signals other than the mandatory signals cannot be allocated to radio resources to which the mandatory signals are allocated, the mandatory signals increasing in accordance with the advance of the wireless communication system hinder the degree of freedom of scheduling of the wireless communication system and also restricts introduction of more efficient communication technology for the wireless communication system.

DISCLOSURE

Technical Problem

Recently, configuration of new carriers, that is, new carrier types (NCTs), which are free from restrictions of mandatory signals defined up to now has been considered. A method and/or apparatus for configuring or recognizing the new carriers while maintaining compatibility with an apparatus configured according to a legacy system are needed.

In more detail, an abject of the present invention is to provide a method for receiving and transmitting a broadcast signal in a wireless communication system that supports NCT.

In more detail, another object of the present invention is to provide a method for receiving and transmitting a broadcast signal by considering interference from a neighboring cell if there is interference from the neighboring cell in a wireless communication system that supports NCT.

The technical objects that can be achieved through the present invention are not limited to what has been particularly described hereinabove and other technical objects not described herein will be more clearly understood by persons skilled in the art from the following detailed description.

Technical Solution

According to one embodiment of the present invention, in a method for receiving broadcast signal through a new carrier type (NCT) in a wireless communication system, the method is performed by a user equipment and comprises blind-decoding a physical broadcast channel (PBCH) received from a base station; and acquiring the number of antenna ports and system information of the base station from the PBCH, wherein the blind decoding is performed within a candidate range for the blind decoding of the PBCH corresponding to a partial area of a downlink subframe, and the candidate range is an area from which a symbol section of the downlink subframe to which a physical downlink control channel (PDDCH) of a neighboring base station is mapped is excluded, and is indicated by the base station in advance.

Preferably, the candidate range may be specified by a starting symbol index to which the PBCH is mapped, the number of resource blocks to which the PBCH is mapped, and the last symbol index to which the PBCH is mapped.

Preferably, the number of resource blocks and the last symbol index may be determined in accordance with the starting symbol index.

Preferably, the PBCH may be mapped to a specific symbol section of the downlink subframe, and the specific symbol section may be determined on the basis of a symbol section to which a PDCCH of another base station is mapped and a primary synchronization signal/secondary synchronization signal (PSS/SSS).

Preferably, the method may further comprise the step of receiving an enhanced PDCCH (EPDCCH) in the downlink subframe by using the acquired system information, wherein if the PBCH is transmitted in the downlink subframe, a starting symbol position of a search space for the EPDCCH may be the same as a starting symbol position to which the PBCH is mapped, or may be determined ahead or behind as much as a certain number of symbols from the starting symbol position to which the PBCH is mapped.

Preferably, the starting symbol position of the search space for the EPDCCH may be indicated by specific information included in the PBCH.

According to another embodiment of the present invention, in a method for transmitting broadcast signal through a new carrier type (NCT) in a wireless communication system, the method is performed by a base station and comprises the steps of receiving information on a position of a symbol of a downlink subframe, to which a physical downlink control channel (PDCCH) of a neighboring base station is mapped, from the neighboring base station to mitigate interference on a user equipment; and transmitting a physical broadcast channel (PBCH) to the user equipment within a candidate range for blind decoding of the PBCH corresponding to a partial area of the downlink subframe, wherein the candidate range is an area from which a symbol section of the downlink subframe to which the PDDCH of the neighboring base station is mapped is excluded, and is indicated to the user equipment in advance.

Preferably, the candidate range may be specified by a starting symbol index to which the PBCH is mapped, the number of resource blocks to which the PBCH is mapped, and the last symbol index to which the PBCH is mapped.

Preferably, the number of resource blocks and the last symbol index may be determined in accordance with the starting symbol index.

Preferably, the PBCH may be mapped to a specific symbol section of the downlink subframe, and the specific symbol section may be determined on the basis of a symbol section to which the PDCCH of the neighboring base station is mapped and a primary synchronization signal/secondary synchronization signal (PSS/SSS).

Preferably, the method may further comprise transmitting an enhanced PDCCH (EPDCCH) in the downlink subframe, wherein if the PBCH is transmitted in the downlink subframe, a starting symbol position of a search space for the EPDCCH may be the same as a starting symbol position to which the PBCH is mapped, or may be determined ahead or behind as much as a certain number of symbols from the starting symbol position to which the PBCH is mapped.

Preferably, the starting symbol position of the search space for the EPDCCH may be indicated by specific information included in the PBCH.

According to still another embodiment of the present invention, a user equipment configured to receive a broadcast signal through a new carrier type (NCT) in a wireless communication system comprises a radio frequency (RF) unit; and a processor configured to control the RF unit, wherein the processor is configured to perform blind-decoding for a physical broadcast channel (PBCH) received from a base station and acquire the number of antenna ports and system information of the base station from the PBCH, the blind decoding is performed within a candidate range for the blind decoding of the PBCH corresponding to a partial area of a downlink subframe, and the candidate range is an area from which a symbol section of the downlink subframe to which a physical downlink control channel (PDDCH) of a neighboring base station is mapped is excluded, and is indicated by the base station in advance.

According to further still another embodiment of the present invention, a base station configured to transmit a broadcast signal through a new carrier type (NCT) in a wireless communication system comprises a radio frequency (RF) unit; and a processor configured to control the RF unit, wherein the processor is configured to receive information on a position of a symbol of a downlink subframe, to which a physical downlink control channel (PDCCH) of a neighboring base station is mapped, from the neighboring base station to mitigate interference on a user equipment, and transmit a physical broadcast channel (PBCH) to the user equipment within a candidate range for blind decoding of the PBCH corresponding to a partial area of the downlink subframe, and the candidate range is an area from which a symbol section of the downlink subframe to which the PDDCH of the neighboring base station is mapped is excluded, and is indicated to the user equipment in advance.

The above technical solutions are merely some parts of the embodiments of the present invention and various embodiments into which the technical features of the present invention are incorporated can be derived and understood by persons skilled in the art from the following detailed description of the present invention.

Advantageous Effects

According to one embodiment of the present invention, NCT may be configured with compatibility with an apparatus configured in accordance with a legacy system.

In more detail, according to one embodiment of the present invention, transmission and reception of a broadcast signal through NCT may be performed.

In more detail, according to one embodiment of the present invention, a broadcast signal may be transmitted or received through NCT without being affected by interference from a neighboring cell.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
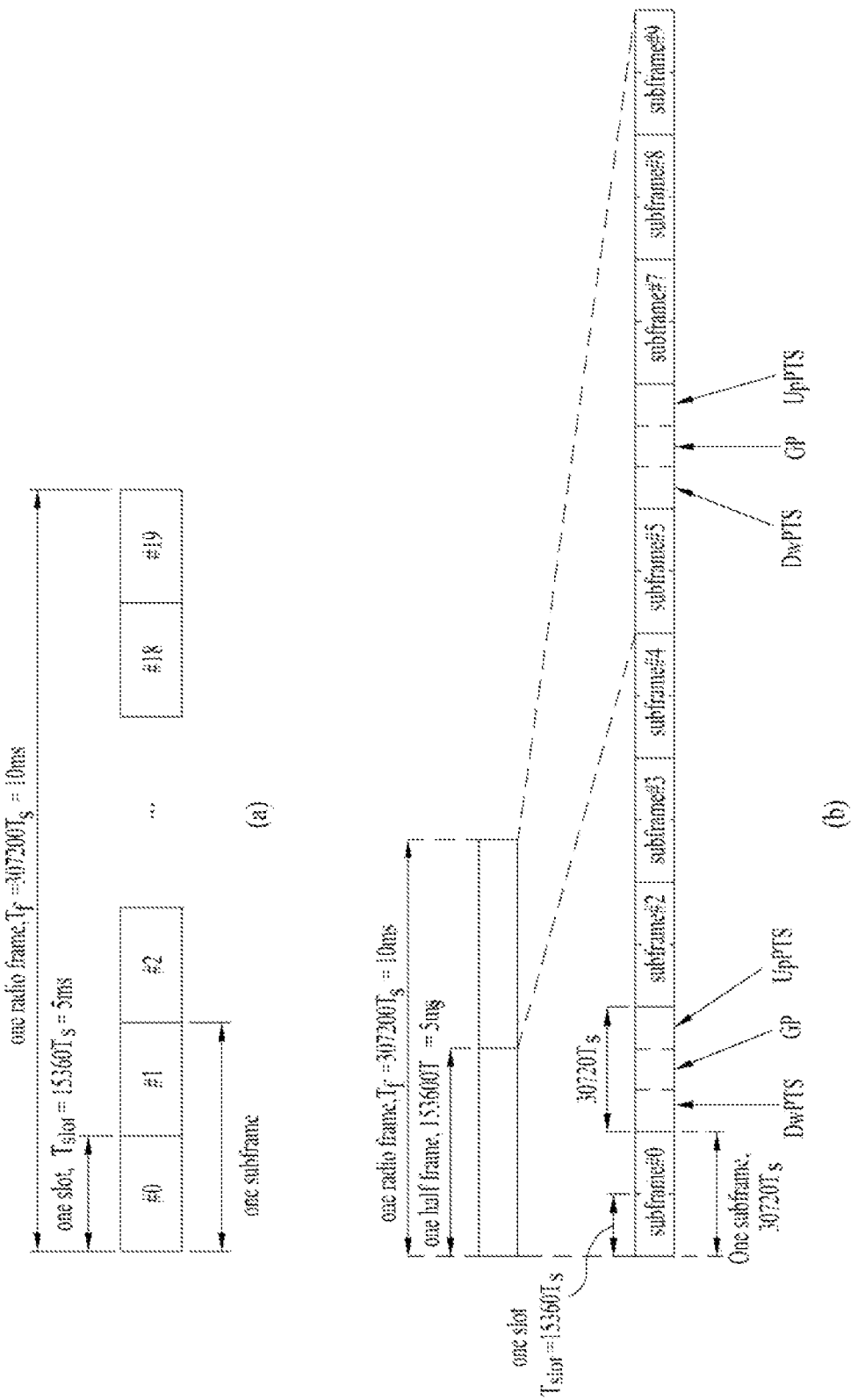
FIG. 1 is a diagram illustrating an example of a structure of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Figure 2:
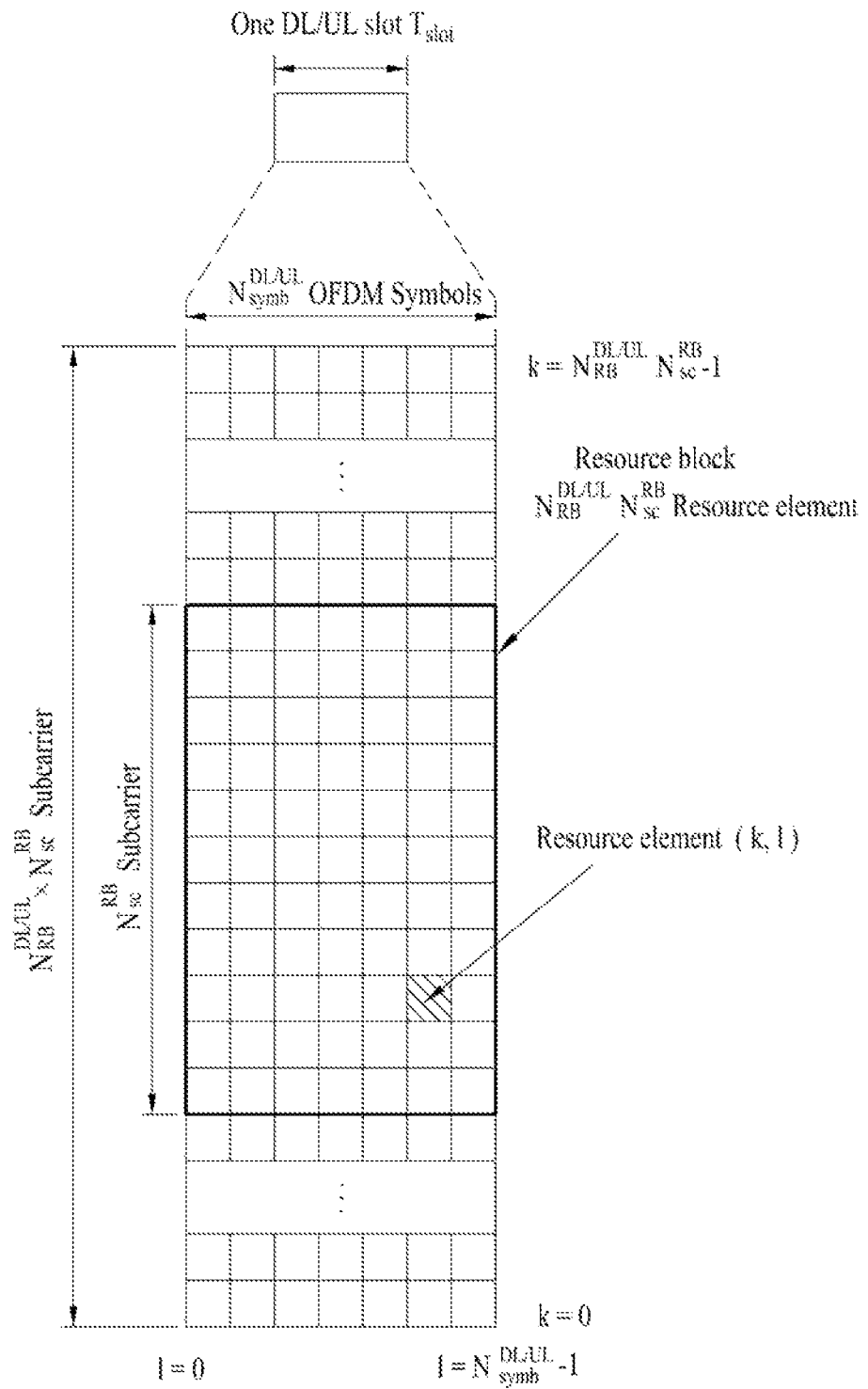
FIG. 2 is a diagram illustrating an example of a structure of a downlink (DL)/uplink (UL) slot in a wireless communication system.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

In order for a UE to receive a signal from an eNB or transmit a signal to the eNB, the UE should be synchronized with the eNB in time/frequency. This is because the UE may determine time and frequency parameters necessary for performing demodulation of a DL signal and transmission of a UL signal at an accurate time only after the UE is synchronized with the eNB.

Figure 3:
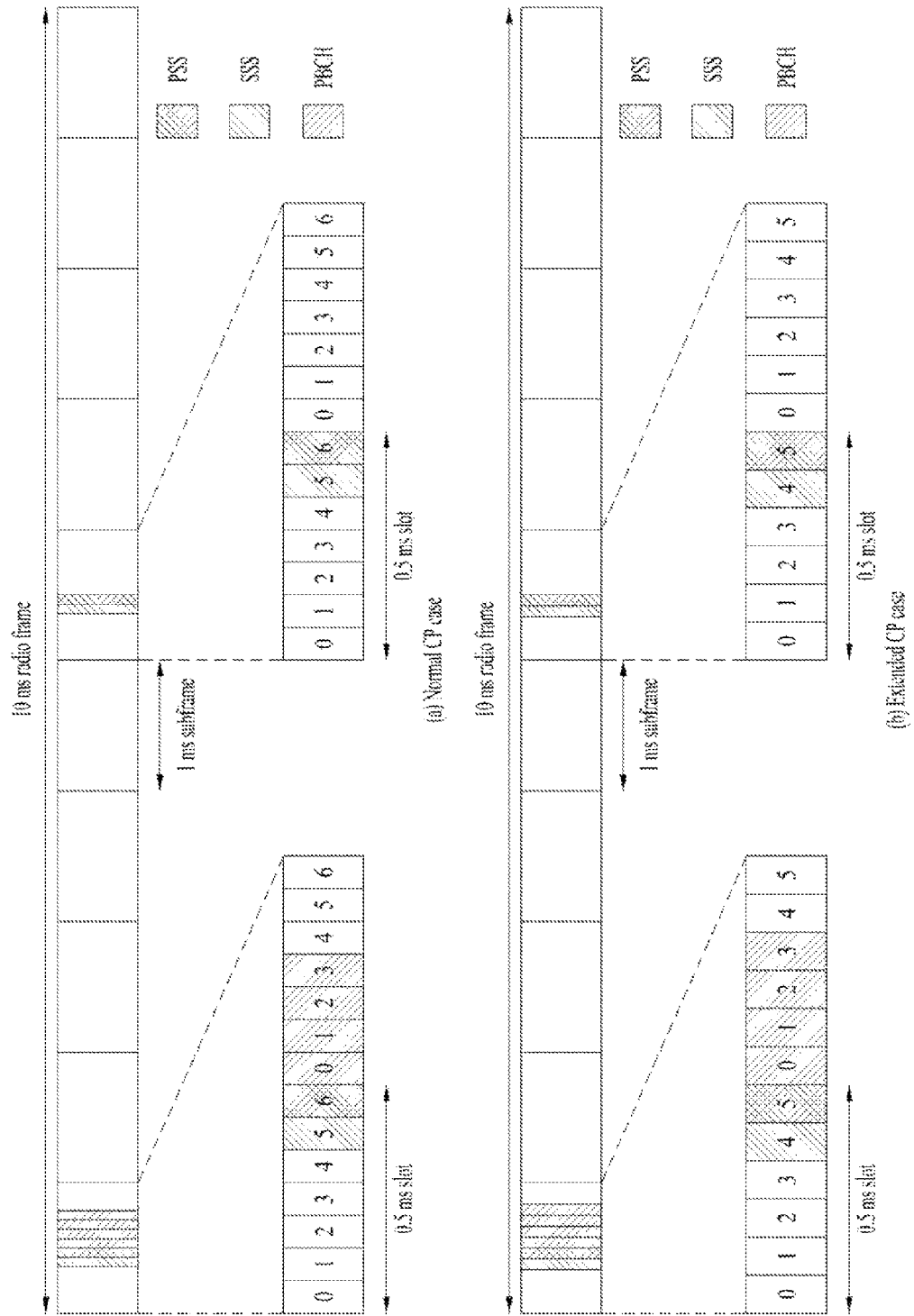
FIG. 3 is a diagram illustrating a radio frame structure for transmission of a synchronization signal (SS)

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission positions of an SS and a PBCH in a radio frame configured as a normal cyclic prefix (CP) and FIG. 3(b) illustrates transmission positions of an SS and a PBCH in a radio frame configured as an extended CP.

If a UE is powered on or newly enters a cell, the UE performs an initial cell search procedure of acquiring time and frequency synchronization with the cell and detecting a physical cell identity $N_{ID}^{cell}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIG. 3. The SS is categorized into a PSS and an SSS. The PSS is used to acquire time-domain synchronization of OFDM symbol synchronization, slot synchronization, etc. and/or frequency-domain synchronization and the SSS is used to acquire frame synchronization, a cell group ID, and/or CP configuration of a cell (i.e. information as to whether a normal CP is used or an extended CP is used). Referring to FIG. 3, each of the PSS and the SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, the PSS is transmitted on the last OFDM symbol of the first slot of subframe 0 and on the last OFDM symbol of the first slot of subframe 5, and the SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS.

An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N_{ID}^{cell}=3 N_{ID}^{(1)}+N_{ID}^{(2)}$ is uniquely defined by number $N_{ID}^{(1)}$ in the range of 0 to 167 indicating a physical layer cell ID group and number $N_{ID}^{(2)}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following Equation.

$$d_u(n) = e^{-j\frac{\pi u n(n+1)}{N_{ZC}}} \quad \text{[Equation 1]}$$

In this case, $N_{ZC}$=63 and a sequence element corresponding to a DC subcarrier, n=31, is punctured.

The PSS is mapped to 6 RBs (=72 subcarriers) near to a center frequency. Among the 72 subcarriers, 9 remaining subcarriers carry a value of always 0 and serve as elements facilitating filter design for performing synchronization. To define a total of three PSSs, u=24, 29, and 34 are used in the Equation 1. Since u=24 and u=34 have a conjugate symmetry relation, two correlations may be simultaneously performed. In this case, conjugate symmetry indicates the relationship of the following Equation.

$$d_u(n)=(-1)^n(d_{N_{ZC}-u}(n))^*, \text{ when } N_{ZC} \text{ is even number}$$

$$d_u(n)=(d_{N_{ZC}-u}(n))^*, \text{ when } N_{ZC} \text{ is odd number} \quad \text{[Equation 2]}$$

A one-shot correlator for u=29 and u=34 may be implemented using the characteristics of conjugate symmetry. The entire amount of calculation may be reduced by about 33.3% as compared with the case having no conjugate symmetry.

In more detail, a sequence d(n) used for the PSS is generated from a frequency-domain ZC sequence in accordance with the following Equation.

$$d_u(n) = \begin{cases} e^{-j\frac{\pi u n(n+1)}{63}} & n = 0, 1, \ldots, 30 \\ e^{-j\frac{\pi u n(n+1)(n+2)}{63}} & n = 31, 32, \ldots, 61 \end{cases} \quad \text{[Equation 3]}$$

In this Equation 3, the Zadoff-Chu root sequence index u is given by the following table.

TABLE 3

| $N_{ID}^{(2)}$ | Root index u |
|---|---|
| 0 | 25 |
| 1 | 29 |
| 2 | 34 |

Referring to FIG. 3, upon detecting the PSS, the UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame as different sequences.

Figure 4:
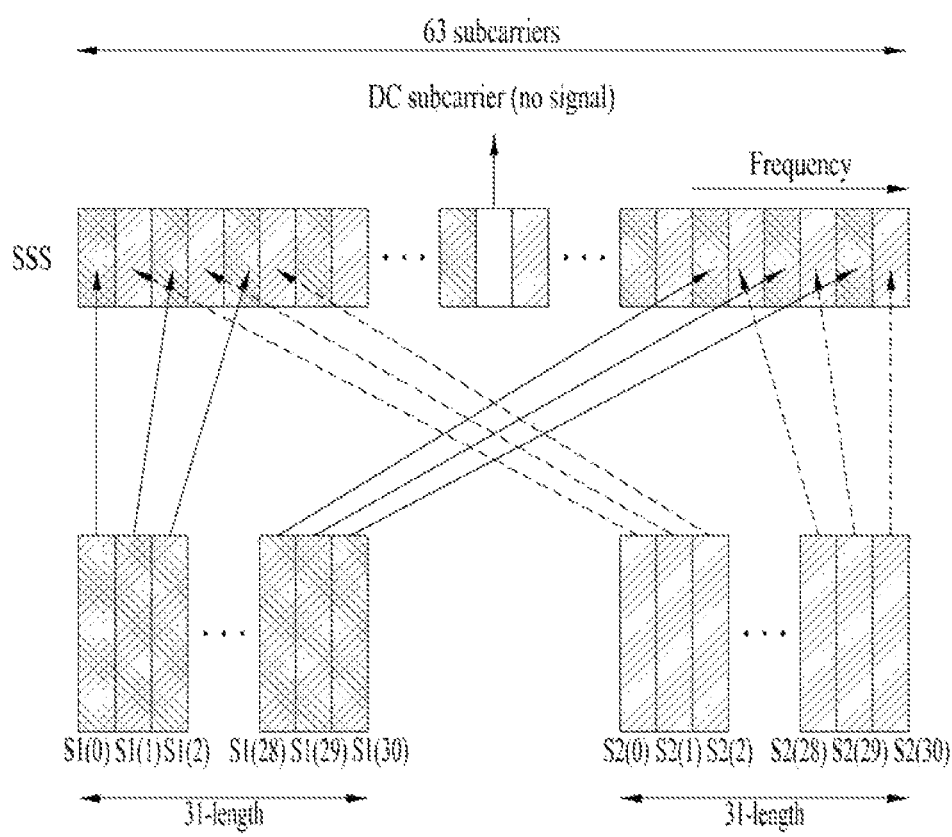
FIG. 4 is a diagram illustrating a secondary synchronization signal (SSS) generation scheme.

FIG. 4 illustrates a secondary synchronization signal (SSS) generation scheme. Specifically, FIG. 4 illustrates a relationship of mapping of two sequences into a logical domain to sequences in a physical domain.

A sequence used for the SSS is an interleaved concatenation of two length-31 m-sequences of and the concatenated sequence is scrambled by a scrambling sequence given by a PSS. In this case, an m-sequence is a type of a pseudo noise (PN) sequence.

Referring to FIG. 4, if two m-sequences used for generating an SSS code are S1 and S2, respectively, two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5+x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms may be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5, and a total of 168 cell group IDs are expressed by a combination of the two length-31 m-sequences. The m-sequences used as sequences of the SSS have a robust property in a frequency selective environment. In addition, since the m-sequences may be transformed by high-speed m-sequence transform based on fast Hadamard transform, if the m-sequences are used as the SSS, the amount of calculation necessary for the UE to interpret the SSS may be reduced. Also, since the SSS is configured by two short codes, the amount of calculation of the UE may be reduced.

Generation of the SSS will now be described in more detail. A sequence d(0), ..., d(61) used for the SSS is an interleaved concatenation of two length-31 binary sequences. The concatenated sequence is scrambled by a scrambling sequence given by the PSS.

A combination of two length-31 sequences for defining the PSS becomes different in subframe 0 and subframe 5 depending on the following.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 4]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In this Equation 4, $0 \le n \le 30$. The indexes $m_0$ and $m_1$ are derived from the physical-layer cell-identity group $N_{ID}^{(1)}$.

$$m_0 = m' \bmod 31 \quad \text{[Equation 5]}$$
$$m_1 = (m_0 + \lfloor m'/31 \rfloor + 1) \bmod 31$$
$$m' = N_{ID}^{(1)} + q(q+1)/2,$$
$$q = \left\lfloor \frac{N_{ID}^{(1)} + q'(q'+1)/2}{30} \right\rfloor, q' = \lfloor N_{ID}^{(1)}/30 \rfloor$$

The output of the Equation 5 is listed in Table 4 following the Equation 11.

The two sequences $s_0^{(m_0)}(n)$ and $s_1^{(m_1)}(n)$ are defined as two different cyclic shifts of the m-sequence s(n) in accordance with the following.

$$s_0^{(m_0)}(n)=s((n+m_0)\bmod 31)$$

$$s_1^{(m_1)}(n)=s((n+m_1)\bmod 31) \quad \text{[Equation 6]}$$

In this Equation 6, $s(i)=1-2x(i)$ $(0\leq i\leq 30)$ is defined by the following Equation with initial conditions $x(0)=0$, $x(1)=0$, $x(2)$, $x(3)=0$, $x(4)=1$.

$$x(\bar{i}+5)=(x(\bar{i}+3)+x(\bar{i}))\bmod 2,\ 0\leq \bar{i}\leq 25 \quad \text{[Equation 7]}$$

The two scrambling sequences $c_0(n)$ and $c_1(n)$ depend on the PSS and are defined by two different cyclic shifts of the m-sequence c(n) in accordance with the following Equation.

$$c_0(n)=c((n+N_{ID}^{(2)}))\bmod 31)$$

$$c_1(n)=c((n+N_{ID}^{(2)}+3))\bmod 31) \quad \text{[Equation 8]}$$

In this Equation 8, $N(2)ID\in\{0,1,2\}$ is the physical-layer identity within the physical-layer cell identity group $N_{ID}^{(1)}$ and $c(i)=1-2x(i)$ $(0\leq i\leq 30)$ is defined by the following equation with initial conditions $x(0)=0$, $x(1)=0$, $x(2)$, $x(3)=0$, $x(4)=1$.

$$x(\bar{i}+5)=(x(\bar{i}+3)+x(\bar{i}))\bmod 2,\ 0\leq \bar{i}\leq 25 \quad \text{[Equation 9]}$$

The scrambling sequences $Z_1^{(m_0)}(n)$ and $Z_1^{(m_1)}(n)$ are defined by a cyclic shift of the m-sequence z(n) in accordance with the following Equation.

$$z_1^{(m_0)}(n)=z((n+(m_0\bmod 8))\bmod 31)$$

$$z_1^{(m_1)}(n)=z((n+(m_1\bmod 8))\bmod 31) \quad \text{[Equation 10]}$$

In this Equation 10, $m_0$ and $m_1$ are obtained from Table 4 following the Equation 11, and $z(i)=1-2x(i)$, $(0\leq i\leq 30)$ is defined by the following equation with initial conditions $x(0)=0$, $x(1)=0$, $x(2)$, $x(3)=0$, $x(4)=1$.

$$x(\bar{i}+5)=(x(\bar{i}+4)+x(\bar{i}+2)+x(\bar{i}+1)+x(\bar{i}))\bmod 2,\ 0\leq \bar{i}\leq 25 \quad \text{[Equation 11]}$$

TABLE 4

| $N_{ID}^{(1)}$ | $m_0$ | $m_1$ |
| --- | --- | --- |
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |

TABLE 4-continued

| $N_{ID}^{(1)}$ | $m_0$ | $m_1$ |
|---|---|---|
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

The UE, which has demodulated a DL signal by performing a cell search procedure using an SSS and determined time and frequency parameters necessary for transmitting a UL signal at an accurate time, may communicate with the eNB only after acquiring system information necessary for system configuration of the UE from the eNB.

The system information is configured by a master information block (MIB) and system information blocks (SIBs). Each system information block (SIB) includes a set of functionally associated parameters and is categorized into an MIB, SIB Type 1 (SIB1), SIB Type 2 (SIB2), and SIB3 to SIB8 depending on included parameters. The MIB includes most frequently transmitted parameters which are essential for initial access of the UE to a network of the eNB. SIB1 includes parameters needed to determine whether a specific cell is suitable for cell selection, as well as information on time-domain scheduling of the other SIBs The UE may receive the MIB through a broadcast channel (e.g. a PBCH). The MIB includes downlink bandwidth (DL BW), PHICH configuration, and a system frame number (SFN). Accordingly, the UE may be explicitly aware of information on the DL BW, SFN, and PHICH configuration by receiving the PBCH. Meanwhile, information which may be implicitly recognized by the UE through reception of the PBCH is the number of transmitting antenna ports of the eNB. Information on the number of transmitting antennas of the eNB is implicitly signaled by masking (e.g. XOR operation) a sequence corresponding to the number of transmitting antennas to a 16-bit cyclic redundancy check (CRC) used for error detection of the PBCH.

The PBCH is mapped to four subframes during 40 ms. The time of 40 ms is blind-detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, the PSS/SSS and the PBCH are transmitted only in a total of 6 RBs, i.e. a total of 72 subcarriers, irrespective of actual system bandwidth, wherein 3 RBs are in the left and the other 3 RBs are in the right centering on a DC subcarrier on the corresponding OFDM symbols. Therefore, the UE is configured to detect or decode the SS and the PBCH irrespective of DL BW configured for the UE.

After initial cell search, the UE which has accessed the network of the eNB may acquire more detailed system information by receiving a PDCCH and a PDSCH according to information carried on the PDCCH. The UE which has performed the aforementioned procedure may perform reception of a PDCCH/PDSCH and transmission of a PUSCH/PUCCH as a normal UL/DL signal transmission procedure.

Figure 5:
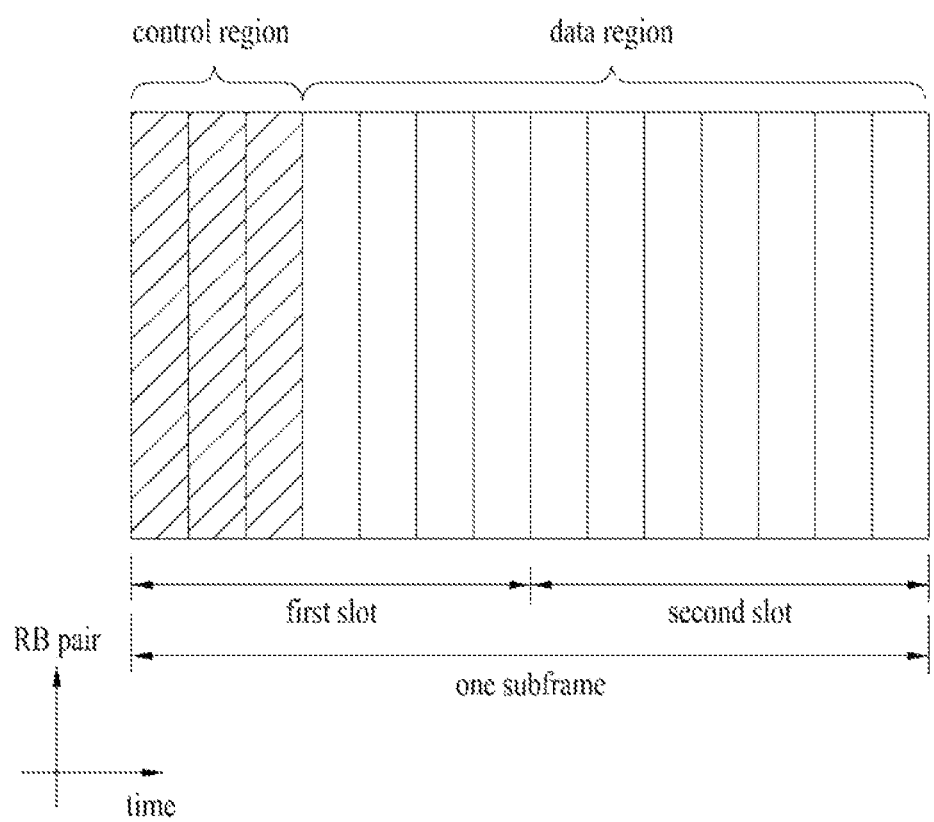
FIG. 5 is a diagram illustrating a structure of a DL subframe used in a 3GPP LTE/LTE-A system.

FIG. 5 illustrates a downlink (DL) subframe structure used in 3GPP LTE/LTE-A.

Referring to FIG. 5, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 5

| Type | Search Space | | Number of PDCCH candidates $M^{(L)}$ |
|---|---|---|---|
| | Aggregation Level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 6:
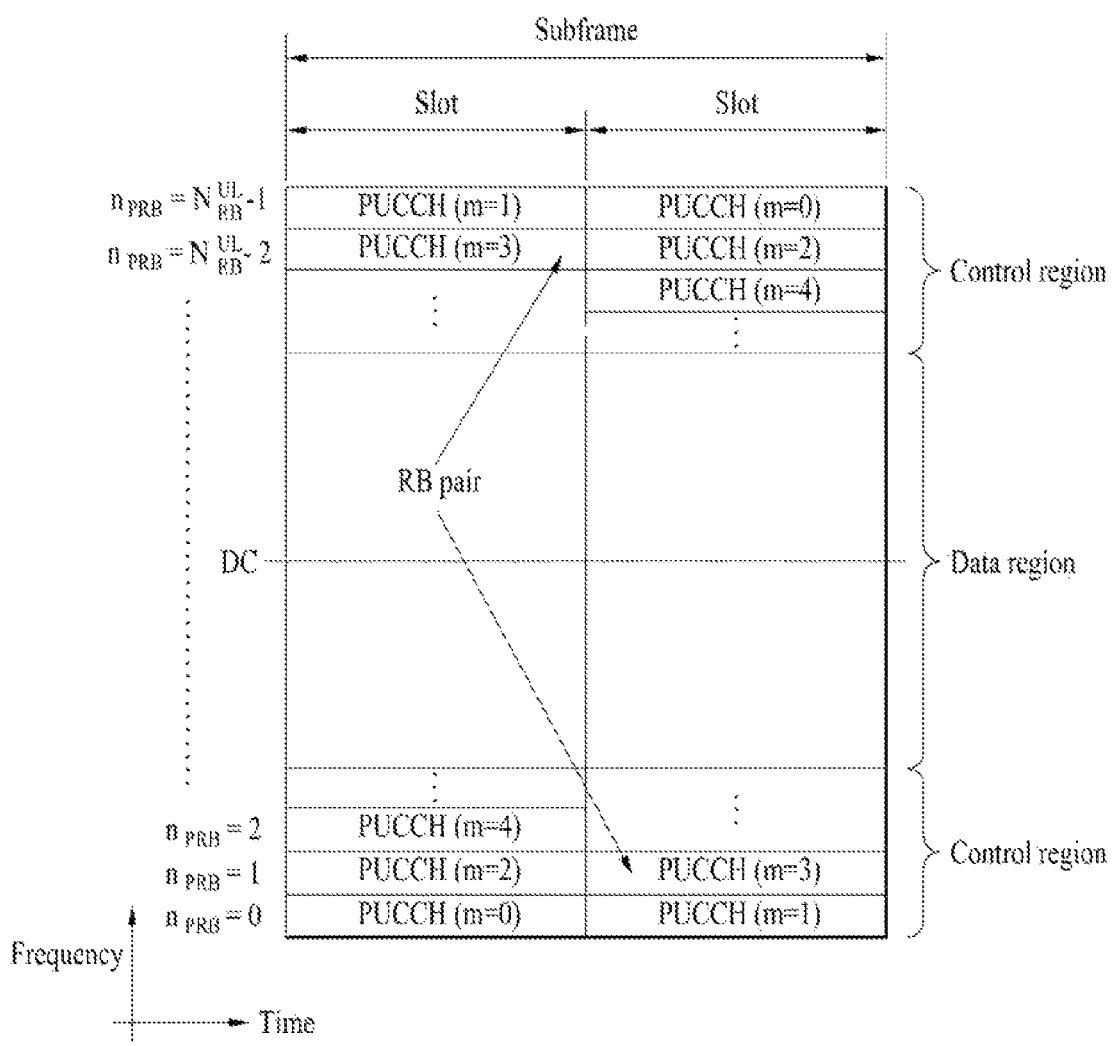
FIG. 6 is a diagram illustrating a UL subframe used in a 3GPP LTE/LTE-A system.

FIG. 6 illustrates an exemplary uplink subframe structure used in 3GPP LTE/LTE-A.

Referring to FIG. 6, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 6

| PUCCB format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |

TABLE 6-continued

| PUCCB format | Modulation scheme | Number of bits per subframe, $M_{bit}$ | Usage | Etc. |
|---|---|---|---|---|
| 3 | QPSK | 48 | ACK/NACK or SR + ACK/NACK or CQI/PMI/RI + ACK/NACK | |

Referring to Table 6, PUCCH formats 1/1 a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Enhanced PDCCH (EPDCCH)

Owing to introduction of a multi-node system, various communication techniques have become available, thereby improving channel quality. However, a new control channel is required to apply Multiple-Input Multiple-Output (MIMO) and Coordinated Multi-Point (CoMP) to the multi-node environment. In this context, Enhanced-Physical Downlink Control Channel (EPDCCH) is under discussion and it is regulated that the EPDCCH is assigned to a data region (hereinafter referred to as a PDSCH region) rather than a legacy control region (hereinafter referred to as a PDCCH region). Consequently, since the EPDCCH enables transmission of control information for a node to each UE, lack of the legacy PDCCH region may be solved. For reference, the EPDCCH is not provided to legacy UEs and only LTE-A UEs can receive the EPDCCH.

Figure 7:
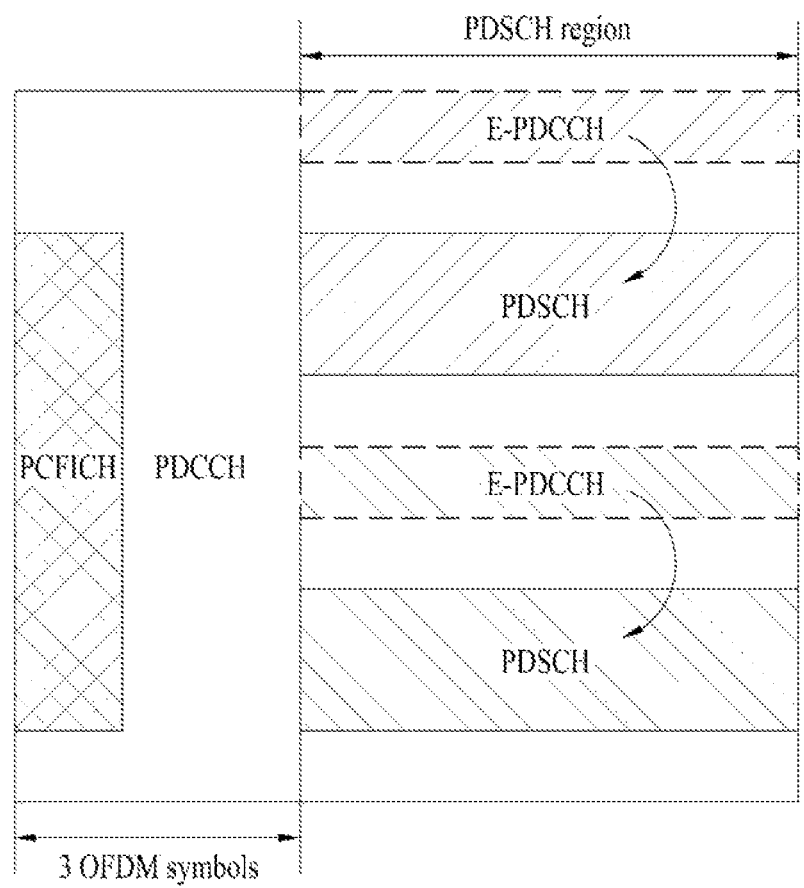
FIG. 7 is a diagram illustrating an example of an EPDCCH and a PDSCH scheduled by the EPDCCH.

FIG. 7 is a view illustrating an EPDCCH and a PDSCH scheduled by the EPDCCH.

Referring to FIG. 7, an EPDCCH may be defined in a portion of a PDSCH region in which data is generally transmitted, and a UE should perform blind decoding to detect whether an EPDCCH directed to the UE is present. The EPDCCH performs scheduling operation (e.g., PDSCH and PUSCH control) like a legacy PDCCH. However, if the number of UEs connected to the same node such as a Remote Radio Head (RRH) is increased, a larger number of EPDCCHs are assigned to the PDSCH region and thus the number of times that blind decoding should be performed by the UE is increased, thereby increasing complexity.

A method for multiplexing EPDCCHs for a plurality of UEs needs to be considered. Specifically, a multiplexing technique for cross-interleaving EPDCCHs of multiple UEs in the frequency domain or the time domain while a common resource region, i.e., a common PRB set, is configured has been suggested.

Figure 8:
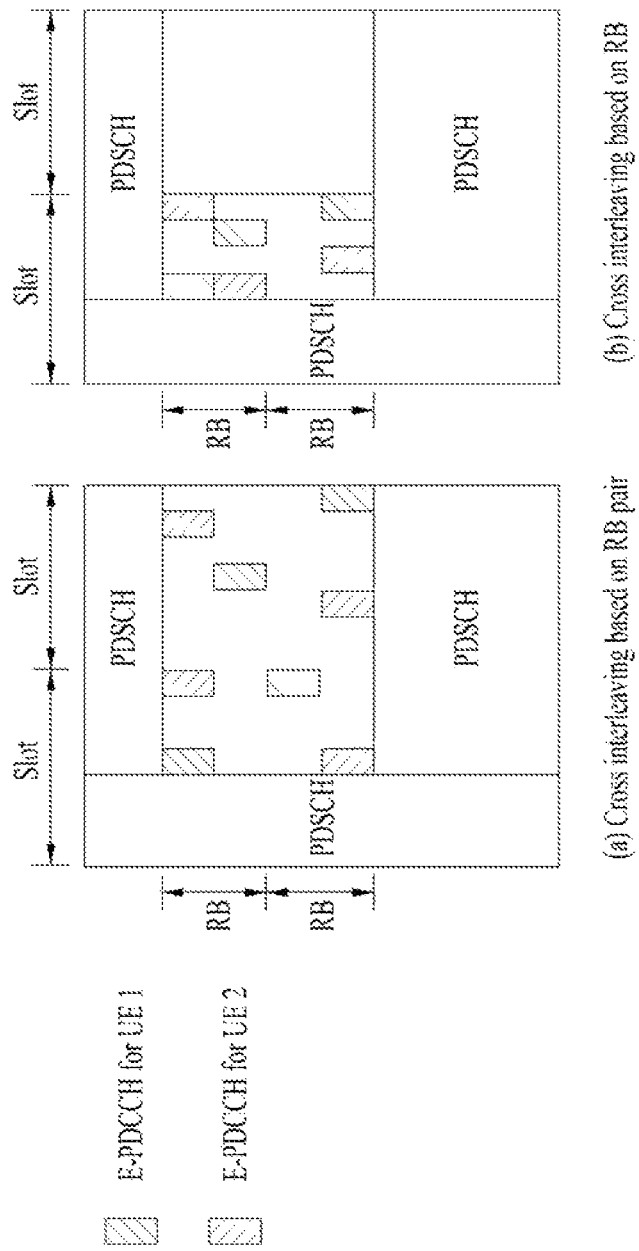
FIG. 8 is a diagram illustrating a method for multiplexing an EPDCCH for a plurality of user equipments.

FIG. 8 is a view illustrating a method for multiplexing EPDCCHs for a plurality of UEs.

Specifically, FIG. 8(a) illustrates an example in which a common PRB set is configured on a PRB pair basis and cross interleaving is performed based on the PRB pair. On the other hand, FIG. 8(b) illustrates an example in which a common PRB set is configured on a PRB basis and cross interleaving is performed based on the PRB. This scheme has an advantage of acquiring a diversity gain in terms of the frequency/time domain over a plurality of RBs.

NCT (New Carrier Type)

NCT refers to a carrier type newly defined unlike that defined in the legacy LTE wireless communication, and is intended to enhance energy efficiency and improve system throughput by minimizing legacy control signaling and cell-specific reference signal (CRS) transmission. In this specification, a carrier which is a carrier type defined in the legacy LTE system and through which a CRS is transmitted to a full band on at least partial OFDM symbols of every subframe and a PDCCH may be transmitted at least partial subframes will be defined as a legacy carrier type (LCT). On the other hand, the NCT is defined as a carrier type through which a CRS is transmitted at partial subframe or frequency resources only or which may not include a PDCCH in all or some of subframes.

General PBCH (Physical Broadcast Channel)

The PBCH is one of physical layers of the LTE system that configures a cell search procedure of a UE together with a PSS and an SSS, and serves to transfer information such as MIB (Master Information Block) which should be discerned by all the UEs which are provided with services. The UE may receive a PBCH of a corresponding cell after acquiring synchronization through the PSS and the SSS and detecting cell ID. This is because that the PBCH is scrambled in accordance with the cell ID.

The PBCH is transmitted using a transmit diversity scheme varied depending on the number of transmitting antennas of the eNB. If the number of transmitting antennas is 2, the PBCH is transmitted in accordance with a space frequency block code (SFBC) scheme, and if the number of transmitting antennas is 4, the PBCH is transmitted in accordance with an SFBC+FSTD (Frequency Switching Transmit Diversity) scheme. Therefore, the UE should be aware of the number of transmitting antennas of the eNB to receive the PBCH. To this end, an implicit signal scheme is used in the LTE system. That is, after CRC is added to a BCH transport block, a signal varied depending on the number of antennas is masked, whereby the UE may blind-detect the number of transmitting antennas of the eNB.

Since the PBCH should be received by all the UEs irrespective of a transmission bandwidth, the PBCH is transmitted from 6 RBs located at the center of the system bandwidth, and reserves first (or starting) 4 OFDM symbols of a second slot of a first subframe in a radio frame that satisfies $n_f \mod 4=0$ subsequently to a synchronization signal (SS).

On the other hand, a starting symbol position of the PBCH in the NCT may not be the same as that of the legacy PBCH. This is because that the position of the PBCH may be determined considering that neither the PDCCH nor the CRS may be transmitted in case of the NCT unlike the LCT. Also, the PBCH may be defined to reserve RBs smaller than 6 RBs. In this case, the number of OFDM symbols required for the PBCH may be more increased relatively, whereby the starting position of the PBCH may be determined by a smaller symbol number. For example, in case of a narrow band NCT, a starting symbol number of the PBCH may be configured as a starting symbol of a subframe.

As described above, as the starting symbol of the PBCH may be used from the starting symbol of the subframe, a problem of interference with an LCT cell occurs. This is because that a carrier through which the UE receives the PBCH is used as the NCT, whereas the corresponding carrier may be used in a neighboring cell as the LCT. That is, if the PDCCH is transmitted in the LCT, the PDCCH reserves initial one to three symbols (up to four symbols in case of narrow band) of each subframe. In this case, if the neighboring cell uses the same carrier as the NCT and uses the corresponding symbol for PBCH transmission, interference between PDCCH transmission and PBCH transmission occurs. Especially, if the LCT uses a relatively high transmission power, the NCT cell may be a victim cell while the LCT cell may be an aggressor cell.

Figure 9:
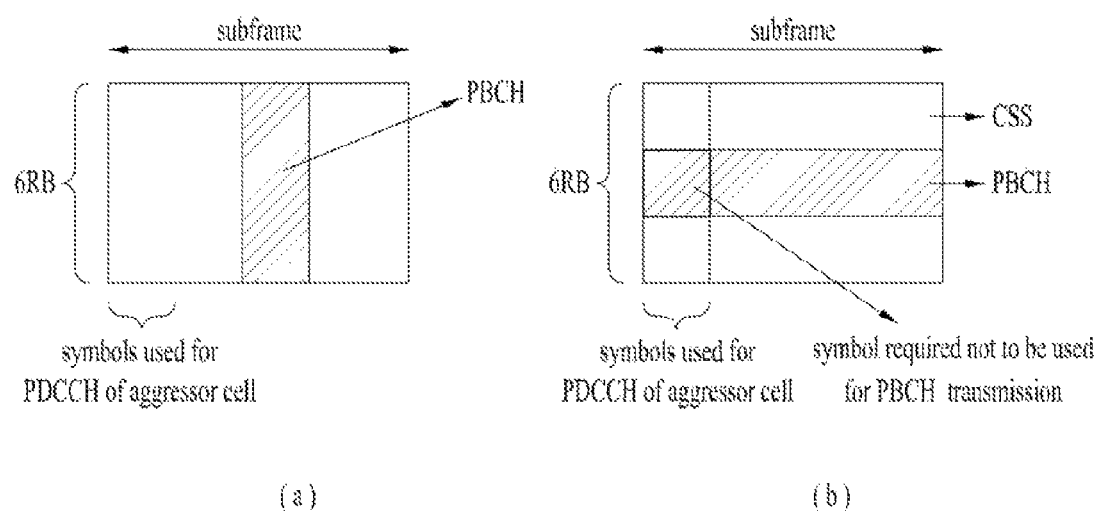
FIG. 9 is a diagram illustrating a position to which a physical broadcast channel (PBCH) within a downlink subframe is transmitted.

FIG. 9 illustrates that the PBCH should be transmitted to avoid a PDCCH transmission section of the aggressor cell.

As described above, the embodiment(s) of the present invention relate(s) to a decoding scheme of the PBCH in performing cell search in the NCT. In more detail, the embodiments of the present invention relate to a starting position of OFDM symbols to which the PBCH is transmitted in the NCT, and PBCH decoding corresponding to the starting position of the OFDM symbols.

First Example—Fixed Starting Position

For stable PBCH transmission in the NCT, the PBCH may be transmitted at a predetermined position previously determined between the eNB and the UE. At this time, the position of the PBCH should be located to avoid a symbol section subjected to strong interference from an aggressor cell. That is, if the LCT cell becomes the aggressor cell, the PBCH should not be transmitted to the position where the PDCCH of the LCT is transmitted. At this time, since the number of transport symbols of the PDCCH may be variable depending on the cell, the number of symbols for the PDCCH may be determined conservatively as much as the number of maximum configurable symbols. For example, since first 4 symbols of each subframe are not used for PBCH transmission in case of a narrow band, a starting symbol position for transmission of the PBCH in the NCT should be defined by the fifth OFDM symbol of the corresponding subframe.

In selecting the transmission position of the PBCH, both a signal of the aggressor cell and another signal transmitted together with the PBCH at a subframe at which the PBCH is transmitted should be considered together. For example, the transmission position of the PBCH should be selected to avoid a PDCCH transmission area of the aggressive LCT cell and at the same time avoid a symbol section reserved by the PSS/SSS if the PBCH and the PSS/SSS are transmitted at the same subframe.

Second Example—Variable Starting Position

A. Position Determination of Symbol for PBCH Transmission

If partial OFDM symbols are not used conservatively in the NCT, it may cause waste of resources. For example, although a starting symbol of the PBCH is defined as the fourth symbol in the NCT, if first one symbol is only used for the PDCCH in an actual aggressor cell, the PBCH is always transmitted from the fourth symbol irrespective of the symbol section of the PDCCH which is actually transmitted, whereby the second and third symbols are wasted.

Therefore, the eNB should adaptively modify and configure the starting symbol for transmission of the PBCH. The eNB may acquire information, which may be helpful for mitigation of interference from the neighboring cell, through a backhaul. For example, the information may include information on a symbol position reserved by the PDCCH of the aggressor cell. Accordingly, the eNB may determine the starting symbol for transmission of the PBCH in accordance with the number of PDCCH symbols of the aggressor cell. For example, if first one symbol within the subframe of the aggressor cell is only used for PDCCH transmission, the PBCH may be transmitted from the second symbol.

B. PBCH Detection

As described above, if the position of the OFDM symbol for PBCH transmission is varied depending on the PDCCH transmission position of the aggressor cell, the UE may blind-detect the starting symbol of the PBCH, which is transmitted from the eNB. This is because that the eNB may modify and configure the starting symbol of the PBCH, whereas the UE is in the state that has not completed PBCH decoding (the state corresponds to the state before RRC connection is established) and thus cannot use a method for obtaining information on the starting symbol of the PBCH from the eNB through RRC signaling. If the UE uses the NCT as a secondary carrier through aggregation with another carrier, the UE may acquire corresponding information from the eNB through a primary carrier.

A candidate tried by the UE to perform blind-detection of the PBCH is limited to a specific range. For example, the candidate may be configured within the range of OFDM symbol #0 to OFDM symbol #4 which is the maximum configurable number of OFDM symbols of the PDCCH. At this time, the UE tries decoding for the number of possible cases of starting symbol of the PBCH in due order, and acquires the number of antenna ports of the eNB and system information (MIB) by successfully performing PBCH decoding when decoding starts at a starting symbol of actual PBCH transmission.

Meanwhile, since configuration of candidates of blind detection for the number of all possible cases may act as considerable overhead, it is preferable to restrict the proper number of candidates, whereby the number of trial times of blind detection may be maintained at a similar level to that of the legacy PBCH. For example, if blind detection required for the number (1, 2 and 4) of antenna ports from the legacy PBCH blind detection is allocated to a starting symbol position, three candidates may be configured approximately.

As a method for restricting candidates of PBCH detection, several symbol positions may be selected randomly. As a simple method, initial several symbol sections of a subframe may be excluded from the candidates. This method is to cover resource waste in some degree and reduce decoding overhead. For example, first and second symbols may always be excluded from a set of PBCH blind detection candidates. Whether to determine a candidate through any one case of all possible cases may be configured in such a manner that one or more specific positions to be candidates should be scheduled previously, or a common rule that may derive the specific positions should be present between the eNB and the UE.

As another method, there is a case where the candidates are restricted very aggressively, that is, the candidates may be configured in such a manner that blind decoding may start from the first symbol, or there is a case where the candidates are restricted very conservatively, that is, the candidates may be configured in such a manner that blind decoding may start from the fourth or fifth symbol.

FIG. 10(a) illustrates an example that a fixed position is used as a position of a starting symbol for transmission of the PBCH, and FIG. 10(b) illustrates an example that candidates of blind detection of the PBCH are restricted to two types. When the PDCCH of the aggressor cell is not transmitted at a PBCH transmission subframe depending on the presence of the aggressor cell, activity of the aggressor cell, ABS pattern, etc., the PBCH is transmitted from the first symbol, whereas the PBCH is transmitted from the sixth symbol if the PDCCH is transmitted.

Figure 11:
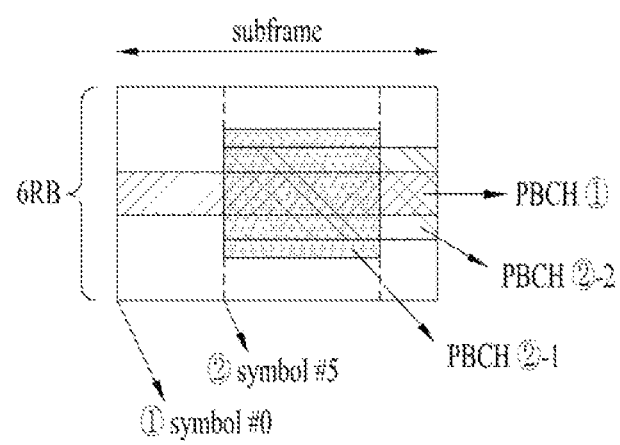
FIG. 11 is other diagram illustrating a position to which a physical broadcast channel (PBCH) within a downlink subframe is transmitted.
Figure 12:
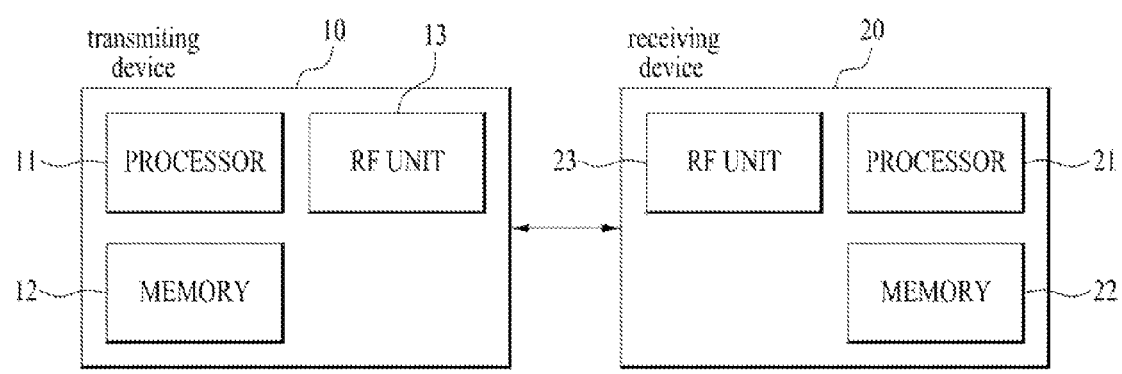
FIG. 12 is a block diagram illustrating an apparatus for implementing the embodiment(s) of the present invention.

If the starting symbol position of the PBCH is varied, the number of RBs used for transmission of the PBCH may be varied. If the starting symbol is the sixth symbol (symbol #5) as shown in FIG. 11, even if all possible symbols are used for PBCH transmission, the number of available symbols is restricted, whereby the PBCH cannot be transmitted with two RBs unlike the case where the starting symbol is the first symbol. Therefore, if the starting symbol is the sixth symbol, the PBCH may use the eleventh symbol (symbol #10) within the subframe at the center 4 RBs (PBCH ②-1), or the PBCH may use the thirteenth symbol (symbol #12) within the subframe at the center 3 RBs (PBCH ②-2). In short, as the position of the starting symbol to which the PBCH is transmitted is varied, the number of RBs required for transmission of the PBCH and the position of the last symbol may be varied, wherein several variable combinations may be configured. Therefore, if the starting symbol for transmission of the PBCH is determined, the number (position) of RBs and the last symbol are determined based on the determined starting symbol, whereby the UE may restrict the number of candidates, which performs blind detection, to a predetermined number. The following Table lists two blind detection candidates for the aforementioned simple example.

TABLE 7

| Candidate | Starting symbol # | # of RB (position) | Last symbol # |
|---|---|---|---|
| 1 | 0 | 2 (center) | 11 |
| 2 | 5 | 3 (center) | 12 |

In the same manner as the case of the fixed starting symbol position of the first example, the number (position) of RBs to which the PBCH is transmitted and the last symbol position are affected even by the presence of the PSS/SSS and the position of the PSS/SSS. For example, if the PSS/SSS uses 6 RBs and the last two symbols at the same subframe, PBCH candidate of which last symbol is located at the symbol #11 as listed in Table 7 cannot be configured. Therefore, the PSS/SSS should be considered together in configuring the blind detection candidates, and if the RB and the last symbol are determined depending on the position of the starting symbol, the candidates should be selected if possible by considering possible RBs/last symbol configuration when each symbol of possible starting symbol positions is selected.

Therefore, if it is intended to allocate less RB to the PBCH, a candidate which uses symbol #4 as a starting symbol and uses 3 RBs may be selected instead of a candidate which uses symbol #5 as a starting symbol and uses 4 RBs. Of course, the starting symbol position cannot be located at the symbol section to which the PSS/SSS is transmitted.

Third Example—CSS Decoding

The UE that has received the PBCH may receive a downlink control channel (Enhanced PDCCH; EPDCCH) by acquiring MIB, etc. A position of a common search space (CSS), which is transmitted in accordance with the NCT, may be defined differently from the position in the legacy LTE. For example, the position of the CSS may be determined similarly to the PBCH such that transmission may be performed at a predetermined position or several possible positions of the CSS may be determined such that the UE may perform blind detection. At this time, the eNBs may mutually exchange information (position of PBCH, position of PDCCH, etc.), which may be helpful for inter-cell interference mitigation, with the neighboring cell through a backhaul, in the same manner as the aforementioned PBCH.

As another method, the position of the CSS, which is transmitted in accordance with the NCT, may be defined from the position of the PBCH. For example, the starting symbol position of the CSS may be defined to be the same position as that of the PBCH. That is, the UE may acquire the starting symbol position of the PBCH by using the methods listed in the first example or the second example. At this time, the UE may decode the EPDCCH on the assumption that the acquired starting symbol position becomes the starting symbol position of the CSS. This is one of methods for reducing overhead in that blind detection should unnecessarily be performed independently for the CSS or the position of the CSS should be signaled. Considering that the CSS is allocated to avoid a PDCCH transmission symbol section of the aggressor cell, equal use of the starting symbol of the PBCH and the starting symbol of the CSS may be a simple method for notifying the UE of the CSS starting symbol.

Also, as still another method, the starting position of the PBCH and the starting symbol position of the CSS may not be defined to be necessarily the same as each other, that is, the CSS starting symbol position may be derived from the PBCH starting symbol position in accordance with a specific rule. In this case, n number of symbol gaps may be configured between respective symbol positions, whereby the UE may decode the CSS.

Meanwhile, the case where the starting symbol at the PBCH is applied to that of the CSS may be limited to partial subframes. In this case, examples of the corresponding subframes may include a subframe for transmitting the PBCH, a subframe for transmitting the PSS/SSS, a subframe for transmitting CRS for tracking, a subframe for transmitting paging, a subframe set predetermined by the standard, or a subframe set indicated by the PBCH.

As further still another method, the eNB may configure the position of the CSS flexibly within an available resource range of the NCT. At this time, the starting symbol of the CSS or DM-RS information may be included in the PBCH, whereby the PBCH may be transmitted. For example, starting symbol position information of the CSS or DM-RS port index may be transmitted together with the PBCH information by using reserved bits of the PBCH, or CRC mask of the MIB may include DM-RS port index information.

This method may be combined with a blind detection method of the UE to reduce a detection range. For example, if a candidate starting symbol position is defined by M number of groups that includes $N_m$ number of symbol positions, an index value of m may be included in the PBCH, or a candidate index explicitly indicating a candidate corresponding to an actual starting position of the CSS may be included in the PBCH.

Also, if the UE acquires the starting symbol position of the PBCH by using the methods listed in the first example or the second example, the UE may assume that a starting symbol position of a user equipment-specific search space (USS) is the same as that of the PBCH until there is any other separate configuration. At this time, if there is any other separate configuration, the starting symbol position of the USS may depend on the separate configuration.

Meanwhile, if the UE acquires the starting symbol position of the CSS (or USS) by using the aforementioned method, and if a PDSCH scheduled by the EPDCCH is for the same CC as that of the CSS (or USS), the UE may assume that a starting symbol position of the corresponding PDSCH is the same as that of the CSS (or USS).

Figure 10:
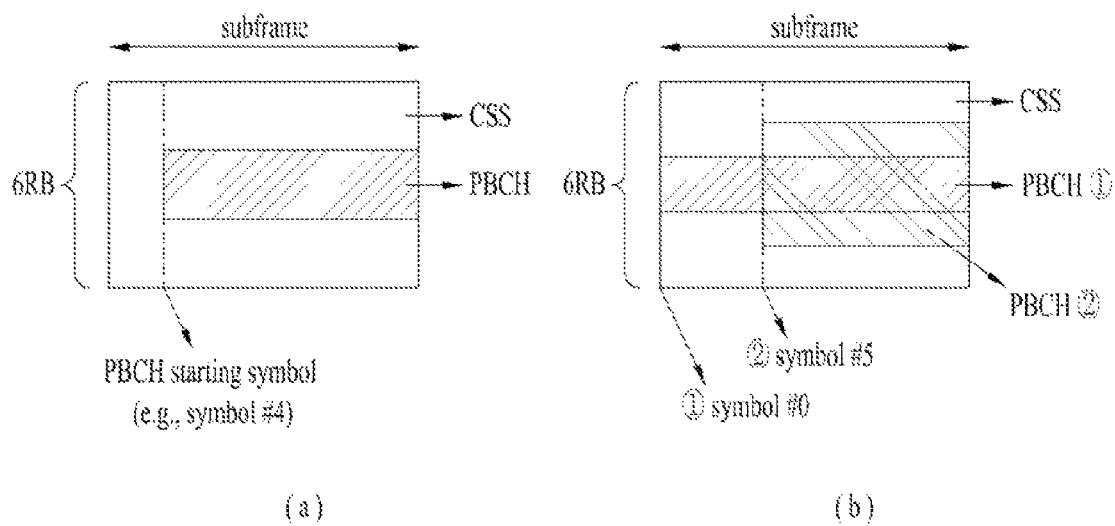
FIG. 10 is another diagram illustrating a position to which a physical broadcast channel (PBCH) within a downlink subframe is transmitted.

FIG. 10 is a block diagram of a transmitting device 10 and a receiving device 20 configured to implement exemplary embodiments of the present invention. Referring to FIG. 10, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a user equipment (UE), a relay and an eNB.

The invention claimed is:

1. A method for receiving a broadcast signal through a new carrier type (NCT) cell in a wireless communication system, the method being performed by a user equipment and comprising:
    blind-decoding a physical broadcast channel (PBCH) on the NCT cell in a plurality of candidate PBCH resources which respectively correspond to a partial area of a downlink subframe, the PBCH being transmitted from a base station; and
    acquiring the number of antenna ports and system information of the base station from the PBCH,
    wherein each of the candidate PBCH resources includes a resource region from which symbols of the downlink subframe to which a physical downlink control channel (PDCCH) of a neighboring base station is mapped are excluded, and is indicated by the base station in advance,
    wherein the each of the candidate PBCH resources is specified by a starting symbol index to which the PBCH is mapped, a number of resource blocks to which the PBCH is mapped, and a last symbol index to which the PBCH is mapped, and
    wherein the number of resource blocks and the last symbol index are determined in accordance with the starting symbol index.

2. The method according to claim 1, wherein the PBCH is mapped to one or more symbols of the downlink subframe, and the one or more symbols are determined on a basis of one or more symbols to which a primary synchronization signal/secondary synchronization signal (PSS/SSS) is mapped.

3. The method according to claim 1, further comprising: receiving an enhanced PDCCH (EPDCCH) in the downlink subframe by using the acquired system information, wherein if the PBCH is transmitted in the downlink subframe, a starting symbol index of a search space for the EPDCCH is the same as the starting symbol index to which the PBCH is mapped, or is determined ahead or behind as much as a certain number of symbols from the starting symbol index to which the PBCH is mapped.

4. The method according to claim 3, wherein the starting symbol index of the search space for the EPDCCH is indicated by specific information included in the PBCH.

5. A method for transmitting a broadcast signal through a new carrier type (NCT) cell in a wireless communication system, the method being performed by a base station and comprising:
   receiving, by the base station, information on symbols of a downlink subframe, to which a physical downlink control channel (PDCCH) of a neighboring base station is mapped, from the neighboring base station;
   allocating, by the base station, a physical broadcast channel (PBCH) in one of a plurality of candidate PBCH resources which respectively correspond to a partial area of a downlink subframe based on the information received from the neighboring base station; and
   transmitting, by the base station, the PBCH to the user equipment,
   wherein each of the candidate PBCH resources includes a resource region from which symbols of the downlink subframe to which the PDCCH of the neighboring base station is mapped are excluded, and is indicated to the user equipment in advance,
   wherein the each of the candidate PBCH resources is specified by a starting symbol index to which the PBCH is mapped, a number of resource blocks to which the PBCH is mapped, and a last symbol index to which the PBCH is mapped, and
   wherein the number of resource blocks and the last symbol index are determined in accordance with the starting symbol index.

6. The method according to claim 5, wherein the PBCH is mapped to one or more symbols of the downlink subframe, and the one or more symbols are determined on a basis of one or more symbols to which a primary synchronization signal/secondary synchronization signal (PSS/SSS) is mapped.

7. The method according to claim 5, further comprising transmitting an enhanced PDCCH (EPDCCH) in the downlink subframe, wherein if the PBCH is transmitted in the downlink subframe, a starting symbol index of a search space for the EPDCCH is the same as the starting symbol index to which the PBCH is mapped, or is determined ahead or behind as much as a certain number of symbols from the starting symbol index to which the PBCH is mapped.

8. The method according to claim 7, wherein the starting symbol index of the search space for the EPDCCH is indicated by specific information included in the PBCH.

9. A user equipment configured to receive a broadcast signal through a new carrier type (NCT) cell in a wireless communication system, the user equipment comprising:
   a radio frequency (RF) unit; and
   a processor configured to control the RF unit,
   wherein the processor is configured to perform blind-decoding for a physical broadcast channel (PBCH) on the NCT cell in a plurality of candidate PBCH resources which respectively correspond to a partial area of a downlink subframe, the PBCH being transmitted from a base station and acquire the number of antenna ports and system information of the base station from the PBCH,
   wherein each of the candidate PBCH resources includes a resource region from which symbols of the downlink subframe to which a physical downlink control channel (PDCCH) of a neighboring base station are mapped is excluded, and is indicated by the base station in advance,
   wherein the each of the candidate PBCH resources is specified by a starting symbol index to which the PBCH is mapped, a number of resource blocks to which the PBCH is mapped, and a last symbol index to which the PBCH is mapped, and
   wherein the number of resource blocks and the last symbol index are determined in accordance with the starting symbol index.

10. A base station configured to transmit a broadcast signal through a new carrier type (NCT) cell in a wireless communication system, the base station comprising:
    a radio frequency (RF) unit; and
    a processor configured to control the RF unit,
    wherein the processor is configured to receive information on symbols of a downlink subframe, to which a physical downlink control channel (PDCCH) of a neighboring base station is mapped, from the neighboring base station, allocate a physical broadcast channel (PBCH) in one of a plurality of candidate PBCH resources which respectively correspond to a partial area of a downlink subframe based on the information received from the neighboring base station and transmit the PBCH to the user equipment, and
    wherein each of the candidate PBCH resources includes a resource region from which symbols of the downlink subframe to which the PDCCH of the neighboring base station is mapped are excluded, and is indicated to the user equipment in advance,
    wherein the each of the candidate PBCH resources is specified by a starting symbol index to which the PBCH is mapped, a number of resource blocks to which the PBCH is mapped, and a last symbol index to which the PBCH is mapped, and
    wherein the number of resource blocks and the last symbol index are determined in accordance with the starting symbol index.

* * * * *